Sept. 5, 1950 T. L. MAY 2,521,471
WELDING DEVICE
Filed April 13, 1949 5 Sheets-Sheet 2
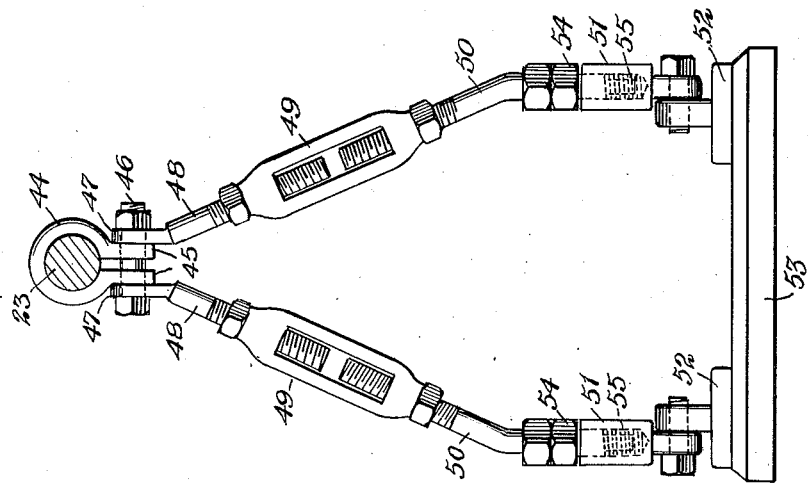
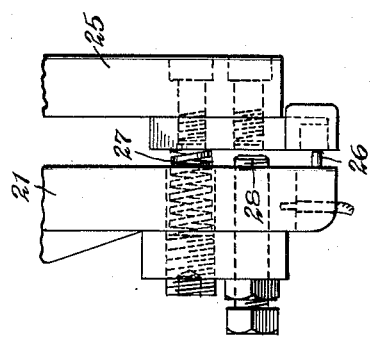
INVENTOR.
Thomas Lestler May
BY
Munn, Liddy & Glaccum
Attorneys

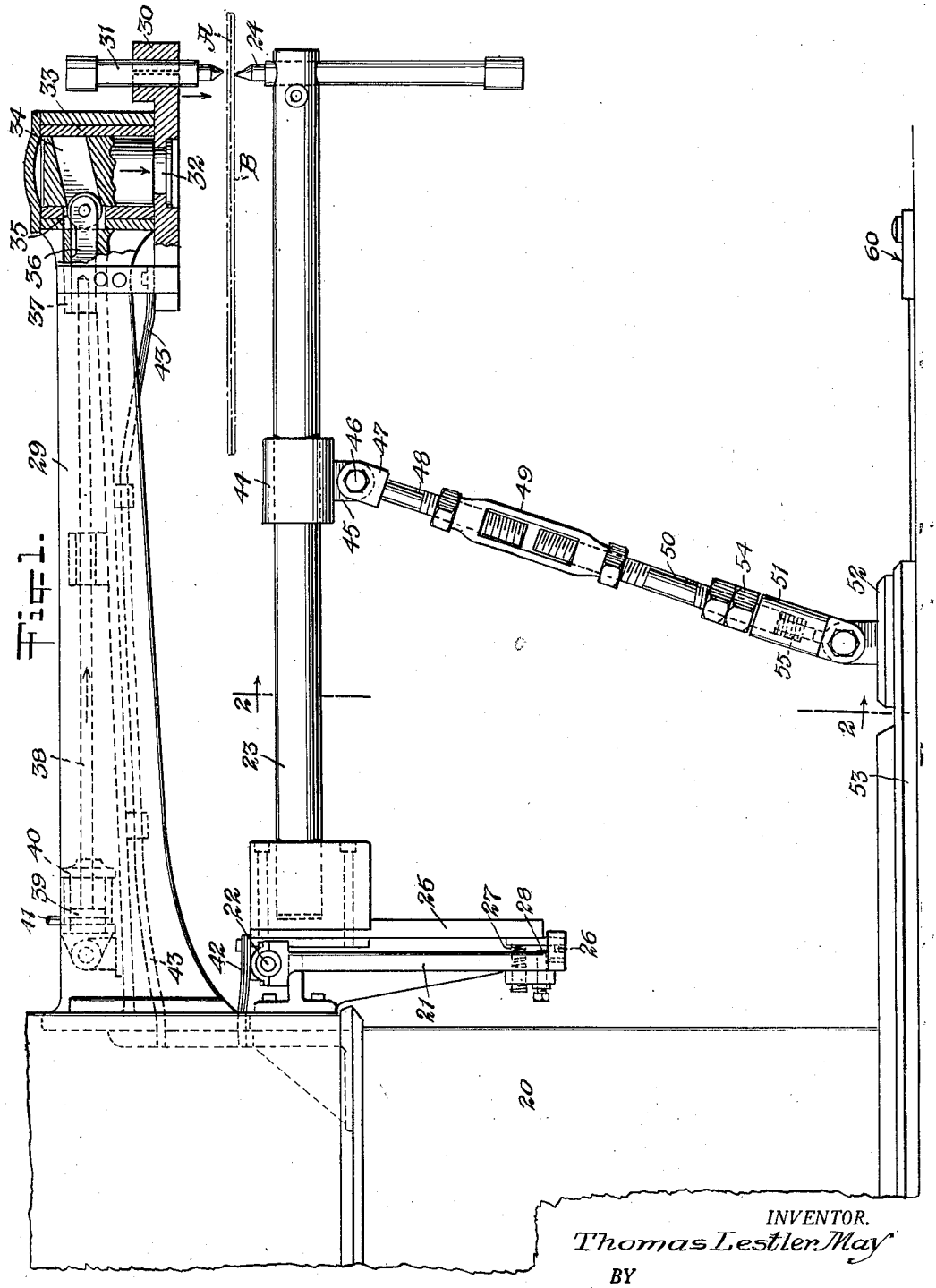

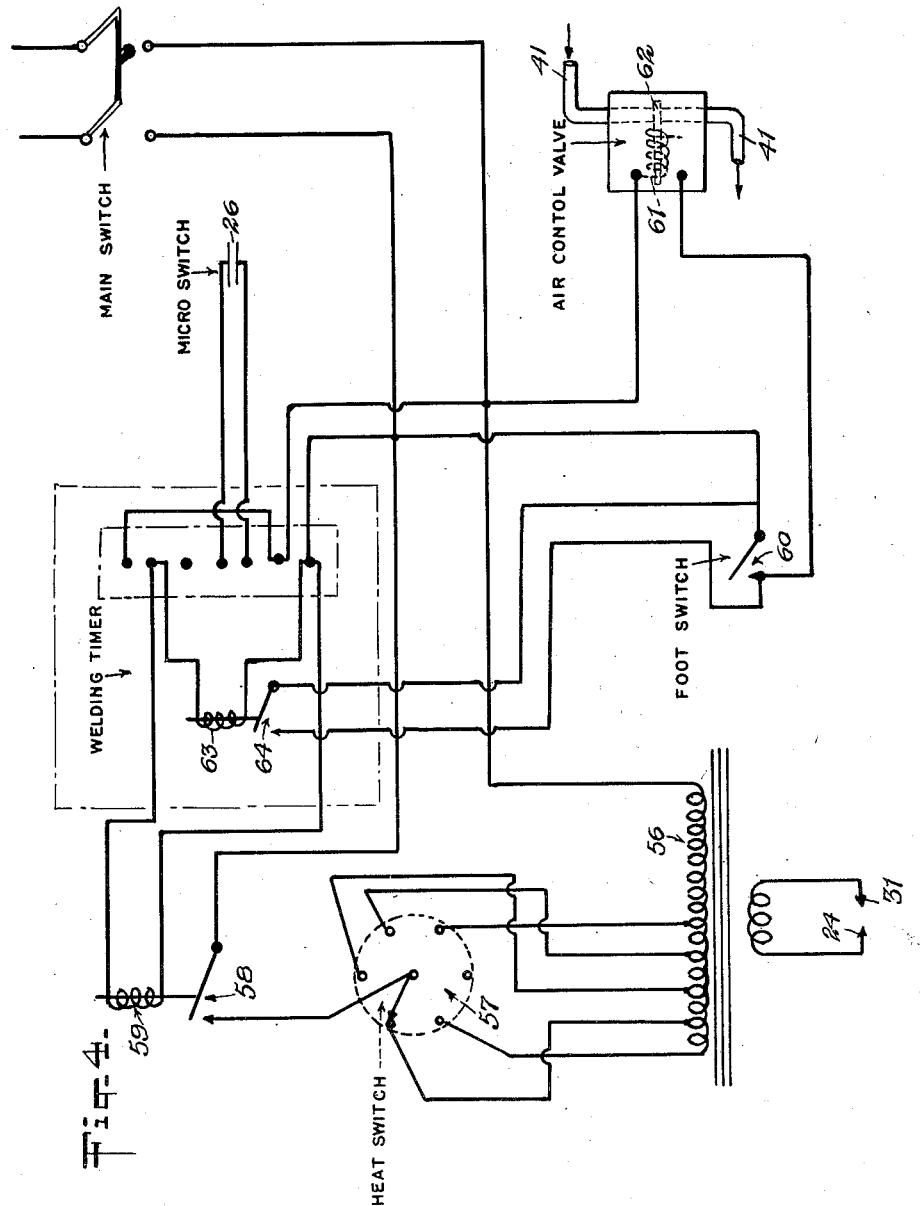

Sept. 5, 1950     T. L. MAY     2,521,471
WELDING DEVICE
Filed April 13, 1949     5 Sheets-Sheet 4
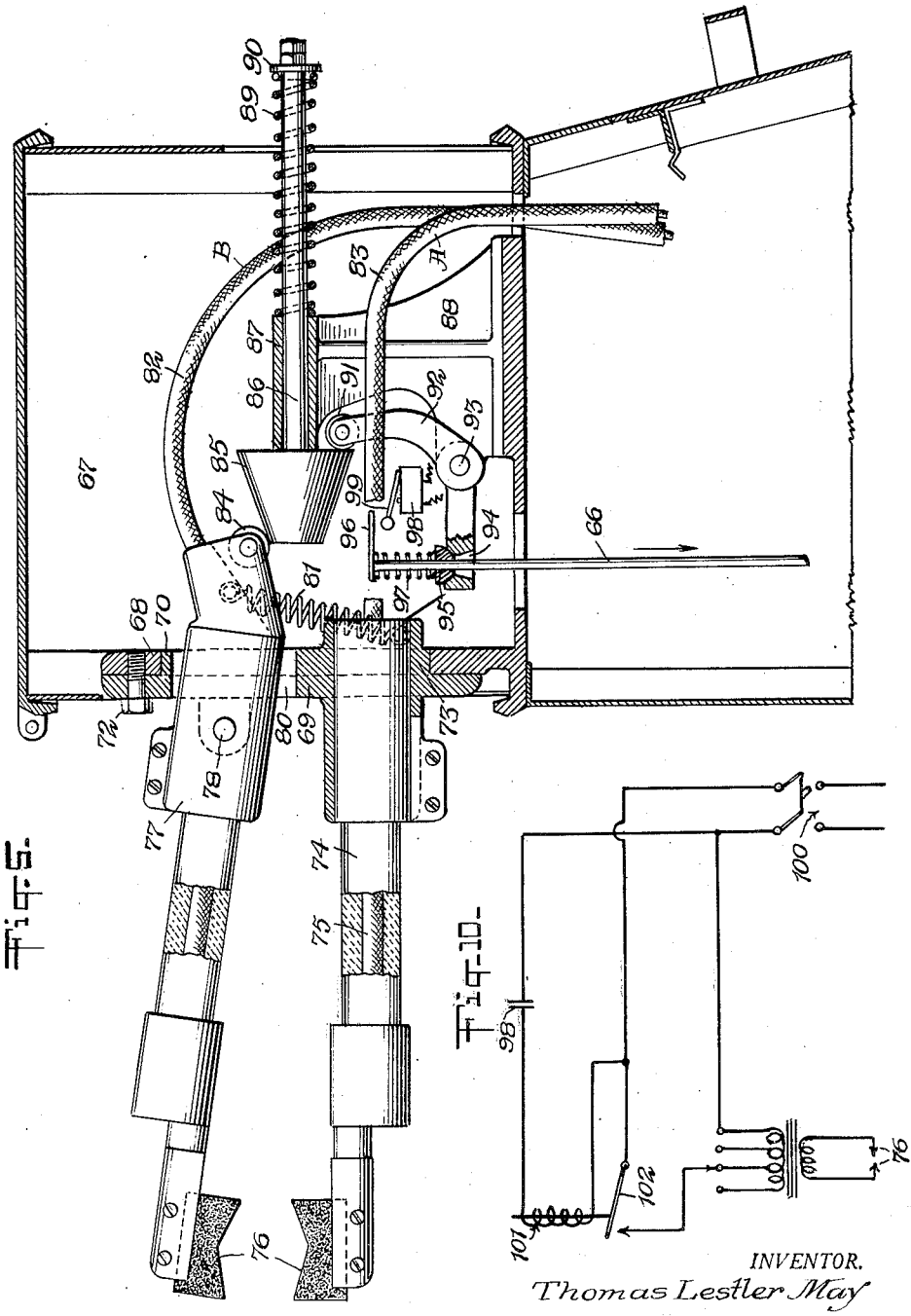
INVENTOR.
Thomas Lestler May
BY
Munn, Liddy & Glaccum
Attorneys

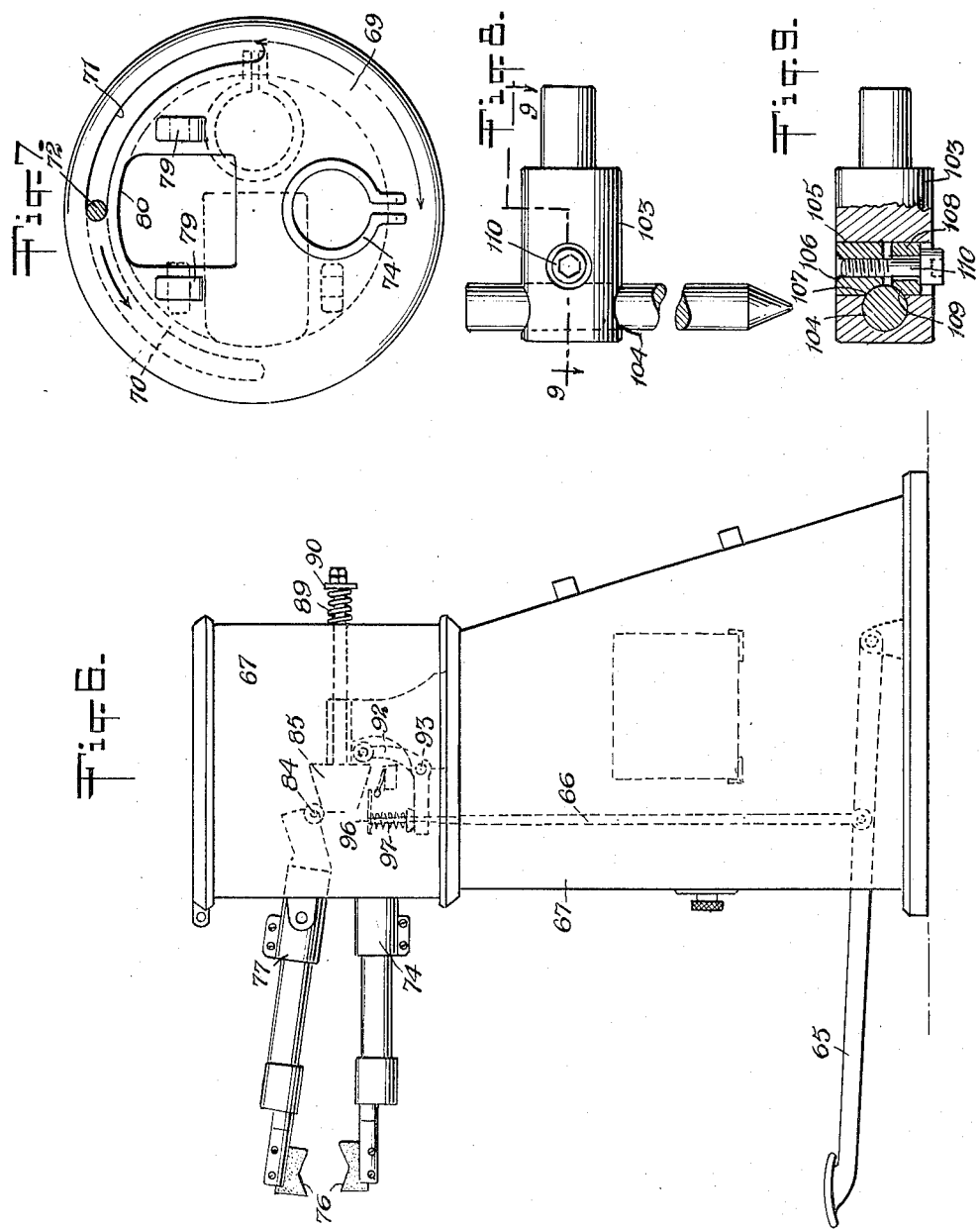

Patented Sept. 5, 1950

2,521,471

UNITED STATES PATENT OFFICE 2,521,471

WELDING DEVICE

Thomas Lestler May, New York, N. Y., assignor to Hi-Ampere Tools Corporation, Bronx, N. Y., a corporation of New York Application April 13, 1949, Serial No. 87,181

3 Claims. (Cl. 219—4)

This invention relates to new and useful improvements in a welding device.

A main object of this invention is to provide a simple, efficient device in which the human element is practically eliminated and assures that every welding operation is given the proper time and the proper pressure thereby insuring accuracy.

A further object is to provide a device of the above character in which welding takes place without any substantial arcing at the electrodes.

A still further object is to provide a device which operates so automatically that it is possible to use inexperienced help without having difficulties in the proper production of work.

Further and more specific objects, features, and advantages will more clearly appear from a consideration of the detailed specification hereinafter set forth especially when taken in connection with the accompanying drawings which illustrate a present preferred form which the invention may assume and which form part of the specification.

In brief and general terms, the invention relates to a welding device in which the electrodes are moved toward each other to grip the work either under the direct control of the operator or by semi-automatic means, and in which a circuit is closed to achieve the welding only after the electrodes have engaged the work with a predetermined amount of pressure and conversely, the circuit is opened before the electrodes are disengaged from the work whereby substantially no arcing takes place.

In one particular form of the invention, the operator merely presses a switch button which causes the advancement of one electrode toward another by means of fluid pressure, and the other electrode is resiliently mounted to assume a normal position, but to be moved therefrom as the other electrode is moved toward it, and the work therebetween is gripped with a predetermined pressure. The second movable electrode is provided with means to resist movement from a normal position and is associated with a circuit closing means so that after the work is engaged with a predetermined pressure, the circuit closing means is operated to apply current to the electrodes and, conversely, the circuit closing means is opened before the electrodes are withdrawn from contact with the work.

Preferably, a welding timing device of any well known form is provided, so that when the above mentioned circuit closing means is operated, the timing device is put into operation for maintaining the circuit connections closed for a predetermined period of time after which the circuit is opened.

A further feature provides means associated with a timing device and in parallel with the switch operated by the operator to maintain the circuit closed even though the operator may only close his switch momentarily.

A further feature involves the application of the no-arcing relation to a form of welder in which no automatic timing device is used, and the operation is entirely under the direct control of the operator.

The present preferred forms of the invention are illustrated in the drawings, of which:

Fig. 1 is a side elevation of a preferred form of the device, with portions in section;

Fig. 2 is a vertical section taken on the line 2—2 of Figure 1;

Fig. 3 is a partial enlarged elevation of the micro-switch operated when the electrodes are brought together;

Fig. 4 is a circuit diagram of the connections for the form of device shown in Figure 1;

Fig. 5 is an enlarged vertical section taken through another form of the device;

Fig. 6 is a side elevation of this modified form of device;

Fig. 7 is a front elevation of the rotatable plate for shifting the electrodes;

Fig. 8 is a detail showing the mounting of an electrode;

Fig. 9 is a cross section taken on the line 9—9 of Fig. 8; and

Fig. 10 is a circuit diagram of the form of the device shown in Figure 5.

Referring now merely to the specific preferred forms of the invention illustrated herein, it is to be noted that the most preferred form is shown in Figures 1 to 4 inclusive, and illustrates a form of non-arcing welding device in which the control of the operation is entirely automatic after the operator has closed the starting switch or button. In this form, there is shown a housing 20, to the upper end of which is connected a dependent bracket 21. To this bracket at 22 is pivoted an electrode support in the form of an arm 23 at the outer end of which an electrode 24 is adjustably connected in any desired manner. To this supporting arm is dependently connected a plate 25 which, as the arm 23 is pivoted around point 22, is adapted to engage a switch button 26 forming part of a well-known micro-switch supported on the lower end of the bracket 21 and connected to circuit wires of which one is shown in Figure 3. The bracket is also provided with a spring 27 suitably housed therein and the end of this spring is contacted by the adjacent surface of the plate 25 as the plate is moved toward it, and the spring resists the movement of the plate and the consequent closing of the switch until a predetermined pressure is achieved. The bracket 21 is also provided with a screw stop element 28 to definitely limit the movement of the plate 25 toward the bracket 21.

Connected to the housing 20 above the supporting arm 23 for the lower electrode 24 is a horizontally extending hollow arm or support 29, at the outer end of which is disposed a plate 30 on which another electrode 31 is in any suitable manner adjustably supported. The electrodes 24 and 31 are disposed so that their tips extend toward each other in the space between the supporting arms 23 and 29, and are adapted to contact a work piece such as a pair of plates A and B therebetween, for the purpose of welding them together.

The plate 30 supporting the electrode 31 is connected to a piston 32 movably disposed within a cylinder 33 disposed on the outer end of the housing or arm 29. The piston has a transverse sloping slot 34 therein, in which is adapted to extend a roller 35 on the end of a slide 36 slidable in a sleeve 37 fixed to the side of the cylinder. To this slide 36 is connected an operating rod 38, the other end of which is connected to a piston 39 of an air cylinder 40 disposed within the hollow arm 29. This cylinder 40 is connected to any suitable source of air pressure by means of pipes, one of which 41 is shown in Figure 1. The main current is led into the lower electrode through copper strip conductors generally shown at 42, and to the upper electrode by means of conductors 43 connected to the metal plate 30. The lower leads 42 are insulated in any suitable manner (not shown), but the upper one is grounded through the frame of the machine.

In order to provide a definite resistance to the pivotal movement of the lower arm 23, I have provided a combination of elements now to be described. A collar 44 surrounds the arm 23 intermediate its length, and has dependent ears 45 which can be drawn together by means of a bolt 46. This bolt also supports the ends 47 of threaded stems 48 to which a turn buckle element 49 is connected, which in turn connects to another threaded stem 50, the end of which extends into sleeve 51 pivotally mounted on bracket 52 disposed on the base 53 of the device. As shown in Figure 2, there are two sets of these turnbuckle links extending from the collar 44 and the supporting brackets 52 are disposed at their lower ends in a line at right angles to the length of the arm 23. Each lower stem 50 is provided with adjustable nuts 54 to act as stop members to limit the extent to which the lower ends of the stems may project into the sleeves 51. Within the sleeves 51 and around the lower ends of the stems 50, are disposed coiled springs 55 which resist the downward movement of the stems into the sleeves by predetermined amounts. The disposition of the stem supports to each side of the line of the arm 23 as shown in Figure 2, will stabilize the downward movement of the arm and prevent side sway of the arm and consequently of the lower electrode. This construction also provides a cushion for the downward movement of the lower arm 23 and offers predetermined resistance so that the pressure between the electrodes and the work before the switch 26 is closed may be regulated to any desired amount.

In considering the operation of the device, reference may conveniently be given to the circuit diagram set forth in Figure 4, wherein it is shown that the main power switch when closed, will connect the primary of the transformer 56 with the circuit through an adjustable heat switch 57 and a contactor switch 58 operated by a contactor relay 59. The secondary of the transformer 56 is connected to the electrodes 24 and 31.

When the operator presses the button of the foot switch 60, he energizes a relay 61 adapted to operate a valve 62 in the air pipe 41 to admit air to the cylinder 40, and move rod 38 to advance the roller 35 and move the piston 32 down and thus the plate 30 carrying the upper electrode 31. The workman has adjusted the collar 44 around the arm 23 and the turn-buckles, so as to determine the initial position of the arm 23 and the extent of downward movement to be permitted to it with due regard to the character of the work to be welded especially the thickness of the plates to be placed between the electrodes before contact is established and the circuit is closed. The spring 27 and the stop 28 may also be adjusted as the circumstances require so that the micro-switch is not closed until after the electrodes have engaged the work and have produced thereon a determined pressure. The heater switch is also adjusted to give the desired welding temperature.

The welding timer employed may be of any well known type but is capable of being set so that the time for the weld may be adjusted by turning a knob on the outside of the timer casing, as is well known. This timer circuit (not shown), is energized by the closing of the micro-switch 26 after the electrodes 24 and 31 have contacted the work and a determined pressure therebetween has been established. I have added to the welding timer of well known construction, an additional relay 63, as shown, which when energized with the timer will close a switch 64 in parallel with the foot switch 60 and will keep it closed until the timer opens up after the predetermined interval of time for which it has been set. It is therefore, seen that the workman merely has to press on the foot switch for an instant after which the foot may be removed and the operation will proceed automatically without any control on his part, except to hold the work between the electrodes. As soon as the time interval is up, the relays 59 and 63 are naturally de-energized, thus opening their respective switches 58 and 64 and thus cutting off the power and allowing the relay to de-energize and discharge the air from the system and reversing the movement of the roller 35, which will cause the plate 30 to move up with the upper electrode 31 and release the work.

As the upper electrode is raised, the springs 27 and 55 tend to restore the arm 23 and thereby, the lower electrode to normal position. In the operation of this device therefore, it is clear that after the operator steps on the foot switch, or it may be a hand switch, the operation is automatic and the circuit is not closed until the electrodes contact the work with determined pressure. Then the current is turned on and the welding time under adjusted heat, is controlled by the well known timer. At the end of the predetermined time, the main circuit is opened, and the micro-switch is opened by the release of the electrodes and the return of the lower one to normal position. In opening up, it is also clear that the main circuit, through the electrodes, is opened before the electrodes disengage the work so that at no time is there any likelihood of substantial arcing.

Turning now to the form of the invention shown in Figures 5, 6, 7 and 10, there is illustrated a type of device including my invention wherein the operator steps on a foot pedal 65, and depresses a rod 66 disposed within a casing 67. In this form of device, the circuit is closed by a micro-switch but not until the electrodes have contacted the work, and reversely the switch is opened before the electrodes are disconnected from the work and therefore, in either operation there is no arcing to any appreciable extent. In the top of the casing 67, there is housed a vertical stationary ring plate 68 fixed to the floor of this part of the casing. A rotatable plate 69 is adjacent the front face of the ring 68 and has a circular flange 70 rotatably seated in the ring opening so that the plate 69 may be rotated. This plate has an arcuate slot 71 therein, in which lies a headed bolt 72 fixed to and extending from the plate 68, and acting to limit the rotation of the plate 69 in one direction or the opposite.

The lower portion of the plate 69 is provided with an integral sleeve hub 73, supporting a sheath or casing 74 for wire 75 and on the outer end of this element is mounted an electrode in any suitable manner and of any suitable type. In the form shown, the electrodes 76 are carbon beveled blocks adapted especially for welding round bars and rods or pipes. By rotating the plate 69, it is clear that the electrodes may be disposed so that the work pieces can be held horizontally or vertically, while being treated as may be desired. The lower electrode 76 is mounted in a fixed position on the supporting plate 69 but the upper electrode 76 is pivoted to the plate by having its sheath or casing 77 provided with extending lugs 78 on opposite sides thereof to extend into openings in spaced ears on the front face of the plate 69. This sheath 77 extends through an opening 80 in the plate 69, and therefore, can be pivoted around the ears 79 so as to raise or lower the upper electrode 76 with respect to the lower electrode 76 to release and grip a work piece between them.

A spring 81 attached to the casing 67 at one end, engages the casing or sheath 77 at the other and tends to hold the electrode sheath 77 in its elevated position, as shown in Figure 5. Wires 82 and 83 are connected to the respective electrodes 76 and are connected to the circuit in a manner to be described.

In order to operate the upper electrode and move it downward into operative relation to the lower one, a roller 84 is mounted on the rear end of the sheath 77 to engage a laterally movable conical cam 85, mounted on shaft 86 slidably mounted within a sleeve 87, at the upper end of a base 88. A spring 89 disposed around the shaft 86 extends between the base 88 and a washer 90 on the shaft, tending to keep the conical cam 85 in its retracted position shown in Figure 5. The rear face of this cam is engaged by a roller 91 on a bell crank lever 92, pivoted at 93 on the base 88. The other end of this bell crank is provided with a passage 94 on the upper face of which is seated a hemispherical plug 95 through which passes the rod 66, previously mentioned. To the upper end of this rod 66 is fastened a switch operating plate 96 and between this plate and the plug 95, is disposed a compression spring 97. Adjacent the end of the plate 96 is disposed a micro-switch 98 having an arm 99 adapted to be engaged by the plate 96 when the rod 66 is depressed. The position of this switch is so determined that the rod 66 must be moved to advance the electrodes into engagement with a work piece disposed therebetween before this switch is operated to close the circuit.

In the operation of this device, it will be clear that depression of the pedal 65 will depress rod 66. As this rod is depressed, the bell crank 92 is operated to advance the cam 85, and move the upper electrode 76 toward the lower electrode to grip the work disposed therebetween. The parts are so designed and the movements are so related that only after the work is gripped by a predetermined pressure will the spring 97 start to be compressed and cause the switch 98 to be operated. It is also to be noted that when the parts are released by the foot of the operator, the switch 98 is opened first before the electrodes are disengaged from the work. Therefore, in this operation also, there is no possibility of any substantial arcing being caused since the electrodes engage the work before the circuit is closed and are maintained in contact with the work only after the circuit is opened.

In Figures 8 and 9, I show a preferred form of mounting electrodes of the type shown in Figure 1. These electrodes are received in the head 103 being inserted in the bore 104 therein. Adjacent this bore and at right angles thereto, the head is provided with another bore 105, to receive a tight-fitted interiorly threaded plug 106, this having a surface 107 to engage the electrode. A slidable nut 108 in the bore 105, also has a curved surface 109 to engage the side of the electrode and can be advanced into gripping position by manipulating a threaded bolt 110.

Referring to Figure 10 with respect to the operation, the main switch 100 is closed and the foot pedal 65 is operated. After the electrodes engage the work, the micro-switch 98 is closed energizing the relay 101 to close the switch 102 and apply current to the electrodes. As long as the operator holds the pedal 65 down, the current is applied and the instant he removes his foot or his hand from the pedal 65, the micro-switch 98 is opened causing the opening of the switch 102 after which the electrodes are disengaged from the work.

It is therefore, obvious from the above description when taken in connection with the drawings, that both forms of the invention shown provide means whereby substantial arcing is avoided. In the one form, the operation is practically automatic after the initial pressing of a button by the operator and in the other, is under the direct control of the operator from the beginning to the end of the operation, but in either case, the arcing is avoided.

While the invention has been described in detail and with respect to the preferred form shown in the drawings, it is not to be limited to such details and forms since many changes and modifications may be made in the invention without departing from the spirit and scope of the invention in its broadest aspects. Hence, it is intended to cover any and all forms and modifications of the invention which may come within the language or scope of any one or more of the appended claims.

What I claim as my invention is:

1. A welding device which comprises a pair of electrodes, means for moving one electrode toward the other to grip a work piece therebetween, means associated with the second electrode to move it from a normal position, means associated with the second electrode to resist movement from the normal position, and a switch associated with the second electrode and adapted to be closed after the second electrode has been moved from its normal position.

2. A welding device which comprises a pair of electrodes, fluid operated means under operator control to advance one electrode toward the other, the second electrode being movable from a normal position, spring means to resist said movement from normal position, and a micro-switch associated with the second electrode and adapted to be closed only when the second electrode has been moved a predetermined amount from normal position.

3. A welding device which comprises a pair of electrodes, fluid-operated means to advance one electrode toward the other, a switch moved by the operator to activate the fluid-operated means, the second electrode being movable from a normal position, spring means to resist said movement from normal position, a micro-switch associated with the second electrode and adapted to be closed only when the second electrode has been moved a predetermined amount from normal position, a switch in shunt with the switch moved by the operator, a welding timer device associated with the electrodes and associated with said micro-switch to be activated when the micro-switch is closed, and a relay in said timer to close said shunt switch when the timer is energized.

THOMAS LESTLER MAY.

REFERENCES CITED

The following references are of record in the file of this patent:

UNITED STATES PATENTS

| Number | Name | Date |
|---|---|---|
| 1,326,601 | Ledwinka | Dec. 30, 1919 |
| 1,548,397 | Taylor | Aug. 4, 1925 |
| 1,779,365 | Von Henke | Oct. 21, 1930 |
| 2,063,258 | Martin | Dec. 8, 1936 |
| 2,097,377 | Martin | Oct. 26, 1937 |
| 2,113,664 | Simmie | Apr. 12, 1938 |
| 2,210,709 | Dawson | Aug. 6, 1940 |
| 2,288,567 | Heitman et al. | June 30, 1942 |
| 2,294,388 | Dawson | Sept. 1, 1942 |

FOREIGN PATENTS

| Number | Country | Date |
|---|---|---|
| 336,825 | Germany | Mar. 30, 1922 |